US011760577B2

(12) United States Patent
Westcott et al.

(10) Patent No.: US 11,760,577 B2
(45) Date of Patent: Sep. 19, 2023

(54) RAIL AND TRACK SYSTEM AND ADJUSTABLE CARTRIDGES FOR SUPPORTING SPIRAL AND STRAIGHT CONVEYOR BELTS

(71) Applicant: John Bean Technologies Corporation, Chicago, IL (US)

(72) Inventors: Brian P. Westcott, Sandusky, OH (US); Adam J. Ramsdell, Sandusky, OH (US); Scott M. Kane, Sandusky, OH (US); Ryan C. Harrell, Clyde, OH (US); John J. Bauer, Norwalk, OH (US); Robert C. Brod, Lorain, OH (US)

(73) Assignee: JOHN BEAN TECHNOLOGIES CORPORATION, Chicago, IL (US)

( * ) Notice: Subject to any disclaimer, the term of this patent is extended or adjusted under 35 U.S.C. 154(b) by 59 days.

(21) Appl. No.: 17/602,249

(22) PCT Filed: Apr. 9, 2019

(86) PCT No.: PCT/US2019/026601
§ 371 (c)(1),
(2) Date: Oct. 7, 2021

(87) PCT Pub. No.: WO2020/209845
PCT Pub. Date: Oct. 15, 2020

(65) Prior Publication Data
US 2022/0258980 A1 Aug. 18, 2022

(51) Int. Cl.
*B65G 15/62* (2006.01)
*B65G 21/18* (2006.01)
(52) U.S. Cl.
CPC ........... *B65G 15/62* (2013.01); *B65G 21/18* (2013.01); *B65G 2207/24* (2013.01)

(58) Field of Classification Search
CPC .... B65G 15/62; B65G 21/18; B65G 2207/24; B65G 21/16; B65G 21/06
See application file for complete search history.

(56) References Cited

U.S. PATENT DOCUMENTS

| 4,967,897 A | 11/1990 | Lachonius et al. |
| 5,310,047 A * | 5/1994 | Ledingham ............ B65G 15/62 198/841 |

(Continued)

FOREIGN PATENT DOCUMENTS

| CA | 2673802 A1 * | 1/2010 | ............. B65G 15/62 |
| CN | 1426368 A | 6/2003 | |

(Continued)

OTHER PUBLICATIONS

International Search Report and Written Opinion dated Feb. 5, 2020, issued in corresponding International Application PCT/US2019/026601, filed Apr. 9, 2019, 17 pages.

(Continued)

*Primary Examiner* — Mark A Deuble
(74) *Attorney, Agent, or Firm* — Christensen O'Connor Johnson Kindness PLLC

(57) ABSTRACT

A rail and track cartridge for building straight or radial belt conveyors comprises two or more rails connected to each other, wherein the two or more rails each has a first and second free end; and a track connected to each rail, wherein each track is supported by tabs protruding from the rail, wherein the track is offset to the side from the rail, and an upper track surface is above a top surface of the rail. An adjustable cartridge has bent free ends of the two or more rails attached to the same tier arm to adjust the length of the rails to fit within the tier arms.

20 Claims, 7 Drawing Sheets

(56) References Cited

U.S. PATENT DOCUMENTS

| | | | |
|---|---|---|---|
| 6,170,649 B1 | 1/2001 | Radandt | |
| 6,523,679 B1 * | 2/2003 | Manchester | B65G 15/62 |
| | | | 198/841 |
| 6,796,418 B1 | 9/2004 | Harrison et al. | |
| 7,114,615 B1 | 10/2006 | Karpy | |
| 7,246,697 B2 * | 7/2007 | Hosch | B65G 21/16 |
| | | | 198/841 |
| 10,829,307 B2 * | 11/2020 | McCafferty | B65G 47/54 |
| 10,968,045 B1 * | 4/2021 | Westcott | B65G 33/34 |
| 11,365,059 B2 * | 6/2022 | Marsetti | B65G 17/086 |
| 2006/0070860 A1 | 4/2006 | Huang | |
| 2009/0008225 A1 * | 1/2009 | Call | B65G 15/62 |
| | | | 198/860.1 |
| 2017/0283176 A1 | 10/2017 | Franzaroli | |
| 2018/0312338 A1 | 11/2018 | Bannerman | |
| 2021/0163228 A1 * | 6/2021 | Grävingholt | B65G 15/60 |

FOREIGN PATENT DOCUMENTS

| | | |
|---|---|---|
| DE | 39 22 3997 A1 | 1/1991 |
| EP | 1 364 896 A1 | 11/2003 |
| GB | 2 167 371 A | 5/1986 |
| JP | 3127195 B1 | 5/2017 |
| JP | 2018 080041 A | 5/2018 |
| WO | 2017/048179 A1 | 3/2017 |
| WO | 2017/087321 A1 | 5/2017 |

OTHER PUBLICATIONS

First Office Action and Search Report dated Feb. 21, 2023, issued in corresponding Chinese Patent Application No. 2019800948753, filed Apr. 9, 2019, 12 pages.

Preliminary Office Action Report dated Feb. 28, 2023, in corresponding Patent Application No. BR112021018790-1, filed Apr. 9, 2019, 2 pages.

* cited by examiner

RAIL AND TRACK SYSTEM AND ADJUSTABLE CARTRIDGES FOR SUPPORTING SPIRAL AND STRAIGHT CONVEYOR BELTS

BACKGROUND

Industry demands for more hygienic designs in food processing equipment have led to strict requirements that focus on minimizing contact surfaces, minimizing or eliminating mechanical fasteners, providing access to allow for full inspection, and decreasing the microbe harborage areas.

SUMMARY

One embodiment of the present invention provides further improvements to the track systems used to support belts in spiral and straight conveying systems, including, but not limited to utilizing a hygienic design. The disclosed track system can be used in spiral and straight conveying systems for food, for example.

In one embodiment, a track system for supporting the belt utilizes an offset track arrangement and requires no threaded mechanical fasteners to meet high hygiene standards.

In one embodiment, the track system utilizes a metal profile of sufficient strength to support the loading requirement of the system. Tabs of a specific geometry are cut into the top edge of the metal rails. If needed, the metal rail is then rolled into the required radius for a spiral system, and the tabs are formed adjacent to the roll. These tabs create an offset support path for an extruded plastic track that is pressed into a groove in the metal tabs. The plastic track is retained in place by the interference fit designed into the tab geometry based on the plastic track dimensions.

The offset support path created by the formed tabs provide a belt-supporting track system that increases access for sanitation and inspection while greatly reducing overall contact surfaces. The disclosed track system can satisfy strict requirements for cleanability and lowers the risk of contamination in food and processing facilities.

Also disclosed is rail cartridge system designed to address misalignment and facilitate faster installation of track components. The rail cartridge system can be implemented with the track system having the offset plastic track or used is other different track systems.

In one embodiment, a rail and track cartridge 100, 114 for belt conveyors 102 comprises: two or more rails 128, 130, 132 connected to each other, wherein the two or more rails each has a first and second free end; and a track 110 connected to each rail, wherein each track is supported by tabs 134 protruding from the rail to which the track is connected, wherein the track is offset to the side from the rail to which the track is connected, and an upper track surface is above a top surface of the rail to which the track is connected.

In one embodiment, the tabs 134 are cut from the top side of the two or more rails.

In one embodiment, tabs 134 comprise a groove 136 within which the track is attached.

In one embodiment, the tracks 110 are made from plastic and the rails 128, 130, 132 are made from metal.

In one embodiment, the rail and track cartridge 100, 114 comprise transverse bars 106 connecting more than one rail into a rigid weldment.

In one embodiment, the rails 128, 130, 132 are curved or straight.

In one embodiment, the free ends of the rails 128c, 130c, 132c at a same side are bent to adjust the length of the rails.

In one embodiment, a method of making a belt-supporting structure 112, comprises: joining a plurality of the rail and track cartridges 100, 114 to form a belt-supporting spiral structure 112.

In one embodiment, the method further comprises attaching the first and second free ends of the rails 128, 130, 132 to a first and second tier arm 104, wherein each rail and track cartridge 100, 114 is supported between two tier arms.

In one embodiment, the free ends of the rails 128a, 130a, 132a 128b, 130b, 132b 128d, 130d, 132d of one or more rail and track cartridges 100 are not bent when joining to the tier arms 104.

In one embodiment, the free ends of the rails 128c, 130c, 132c of at least one end of one or more rail and track cartridges 114 are bent when joining to the tier arms 104 to adjust the length of the rails to fit between the tier arms.

In one embodiment, the tier arms 104 joined to the bent free ends comprise a peg 140 upon which the bent free ends rest, wherein the peg 140 extends perpendicular to the tier arm.

In one embodiment, a rail and track system 108 comprises: two or more rails 128, 130, 132 connected to each other, wherein the two or more rails each has a first and second end; a track 110 connected to each rail; and tier arms 104, wherein at least the first ends of the two or more rails 128c, 130c, 132c are bent and attached to a same tier arm 104 to adjust the length of the rails to fit within the tier arms.

In one embodiment, the tier arm 104 to which the bent first ends are attached comprises a peg 140 upon which the bent first ends rest.

In one embodiment, the tier arms 104 are supported from an outer vertical post 116 from which the tier arms extend inward.

In one embodiment, the rail and track system 108 further comprises a belt 102 supported by the tracks.

In one embodiment, each track 110 is supported by tabs 134 protruding from the rail 128, 130, 132 to which the track is connected, wherein the track is offset to the side from the rail to which the track is connected, and an upper track surface is above a top surface of the rail to which the track is connected.

In one embodiment, a rail and track system 108 for belt conveyors 102, comprises: two or more rails 128, 130, 132 connected to each other; and a track 110 connected to each rail, wherein each track is supported by tabs 134 protruding from the rail to which the track is connected, wherein the track is offset to the side from the rail to which the track is connected, and an upper track surface is above a top surface of the rail to which the track is connected.

In one embodiment, the tabs 134 are cut from the top side of the two or more rails.

In one embodiment, the tabs 134 comprise a groove 136 within which the track is attached.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
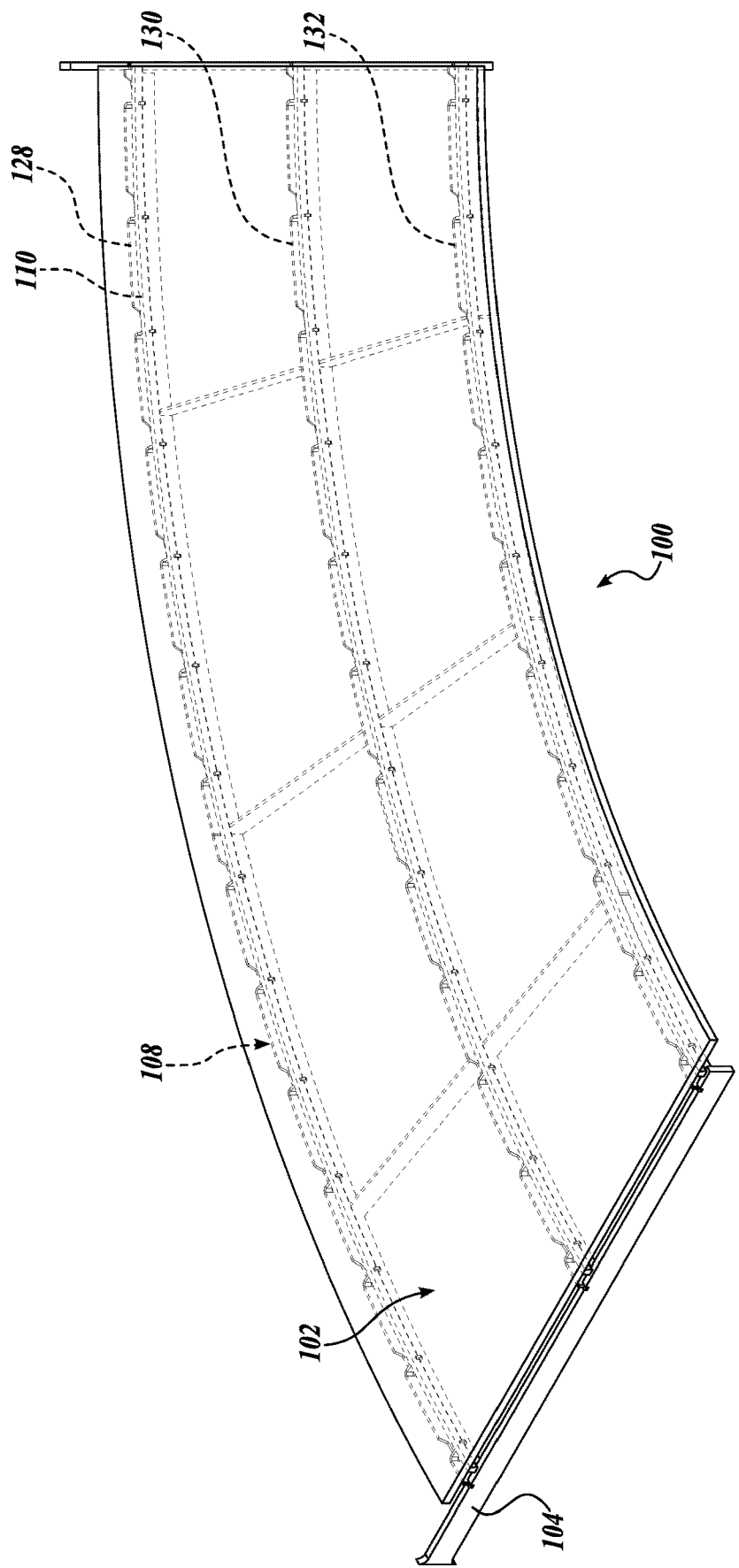
FIG. 1 is a diagrammatical illustration of one embodiment of a section (i.e., cartridge) of a belt-supporting track system.
Figure 4:
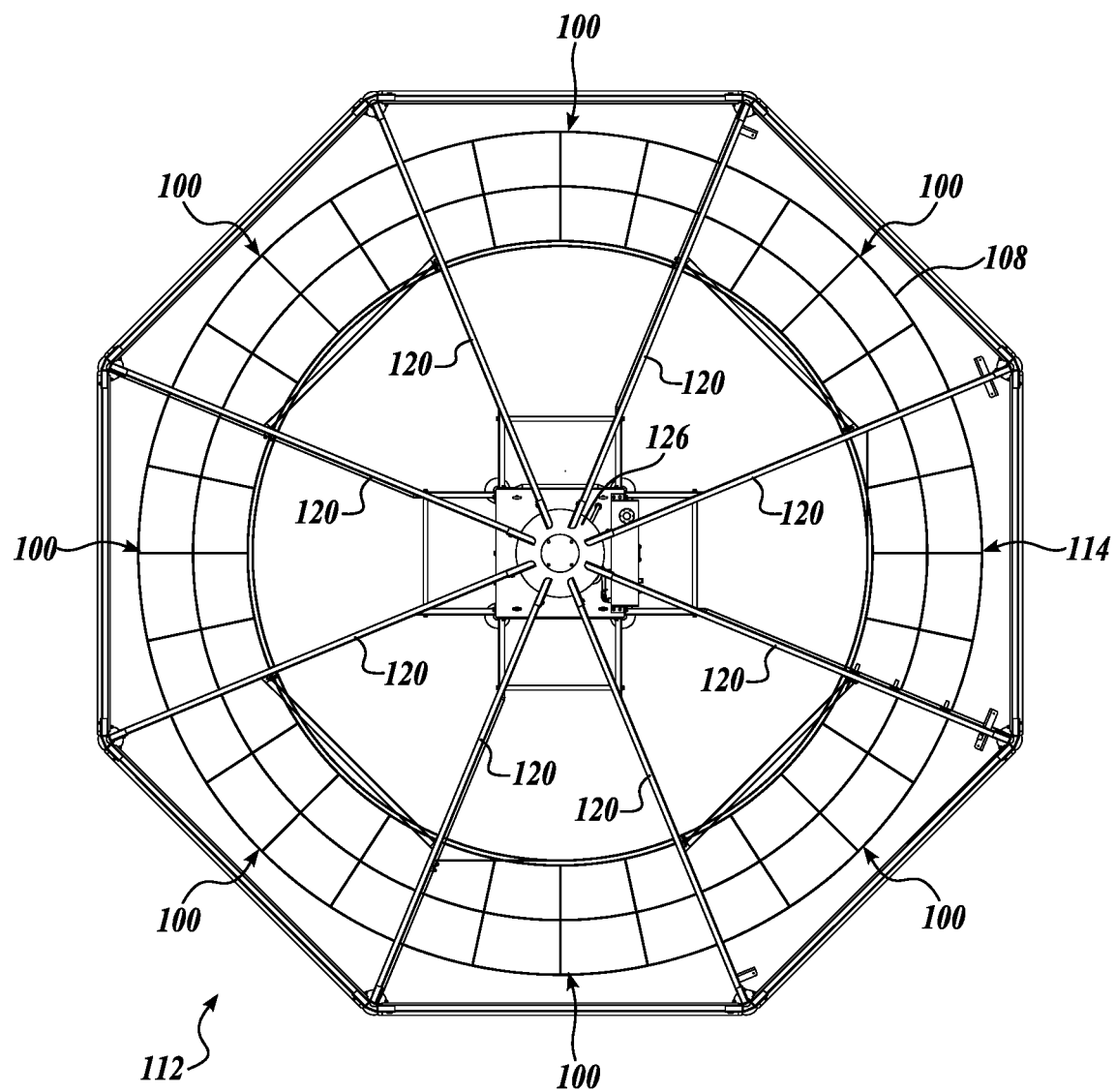
FIG. 4 is a top diagrammatical illustration of belt-supporting spiral structure.
Figure 5:
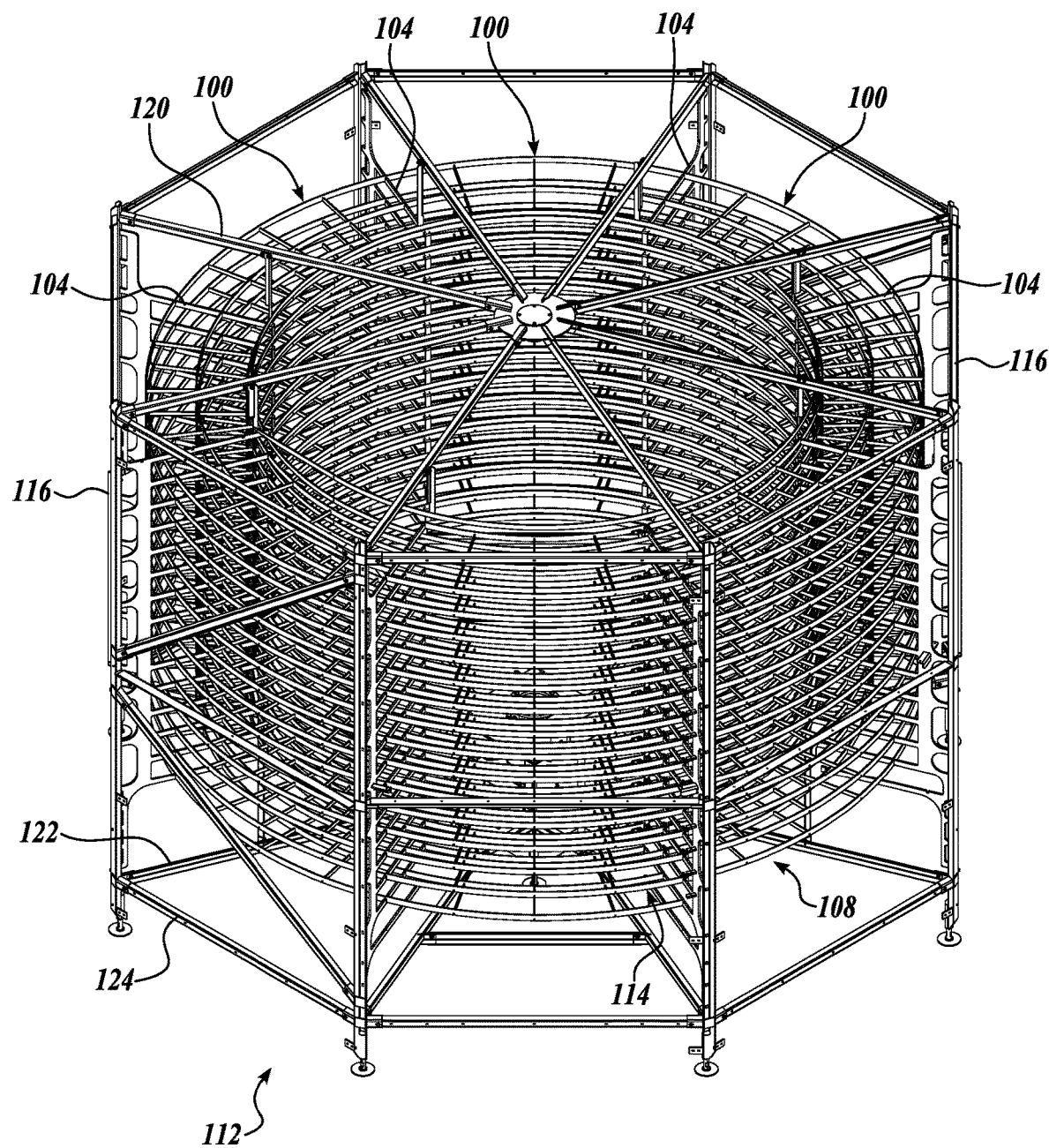
FIG. 5 is an isometric diagrammatical illustration of the belt-supporting spiral structure of FIG. 4.

FIG. 1 is an illustration of a cartridge (or section) 100 of a belt-supporting track system comprising a rail and track system 108 and belt 102. A rail and track system 108 comprises one or more rails 128, 130, 132, and a track 110 for each rail. 1The belt-supporting track system cartridge 100 is one of a plurality of such cartridges that can be joined to form a belt-supporting spiral structure 112 as shown in FIGS. 4 and 5. However, while the FIGURES show a belt-supporting spiral structure 112, the rail and track system 108 of the present disclosure is not limited to a spiral structure, since the rail and track system 108 can be constructed from straight rails and tracks and can be utilized in straight or a combination of straight and spiral structures. As illustrated in FIG. 1, the rail and track system 108 makes contact with the underside of belt 102 and supports the belt 102 on tracks as will be further described.

Referring to FIGS. 4 and 5, the belt-supporting spiral structure 112 has a framework that allows the placement of cartridges 100 to build a spiral conveyor belt path on the framework. The framework is generally metal, such as stainless steel, nickel alloy, or aluminum alloy. The conveyor belt path is constructed from sequentially juxtaposing a plurality of cartridges 100 end-to-end to create the spiral track system that winds around the belt-supporting spiral structure 112. The individual cartridges 100 are supported between any two tier arms 104 (best seen in FIG. 5). The tier arms 104 are not considered part of the cartridge 100, since the tier arms 104 form part of the framework.

A vertical row of tier arms 104 is provided on one of several outer vertical posts 116 forming the exterior framework of the belt-conveying spiral structure 112. Each tier arm 104 in the row extends radially inward sufficient to support the width of the rail and track system 108. In one embodiment, the inside ends of the tier arms 104 are cantilevered. Tier arms 104 are designed to carry the anticipated load. The number of outer vertical posts 116 can vary depending on the size and application. The vertical row of tier arms 104 places a tier arm 104 at each flight in the spiral. Tier arms 104 thus become regularly spaced throughout the entire path upon which to build the rail and track system 108. The inner vertical posts 116 are connected to a top 120 and bottom 122 radial arm. The top radial arms 120 can be joined at the center 126. Similarly, the bottom radial arms 122 can be joined at the center (not shown). Adjacent outer vertical posts 116 are connected to one another through peripheral beams 124.

In one embodiment, the individual cartridges 100 can fit fully between adjacent tier arms 104. Such cartridges 100 are referred to as non-adjustable cartridges 100. However, even though the framework and the spacing of the tier arms 104 is intended to accommodate cartridges 100, misalignments can be unavoidable or small deviations add up to vary the spacing between adjacent tier arms 104. In this case, the present disclosure provides adjustable cartridges 114. Adjustable cartridges 114 comprise a similar rail and track system 108 as the non-adjustable cartridges 100; however, the adjustable cartridges have modified rail ends as further described below. Such modified rail ends are a component of a joining system that allows a gap to exist between the cartridge and the tier arm or between two adjacent rails. The modified rail ends can also allow an adjustable cartridge 114 to fit within a space that is either too long or too short for a non-adjustable cartridge 100. Referring to FIG. 4, in one embodiment, one flight in the spiral comprises seven non-adjustable cartridges 100 and one adjustable cartridge 114. However, the number of adjustable cartridges 114 per flight in the spiral can vary and not every flight might need to have an adjustable cartridge 114. Therefore, the entire spiral rail and track system 108 (and a straight system) can be built upon the tier arms 104 by placing the modular non-adjustable cartridges 100 or adjustable cartridges 114 between two adjacent tier arms 104.

Figure 2:
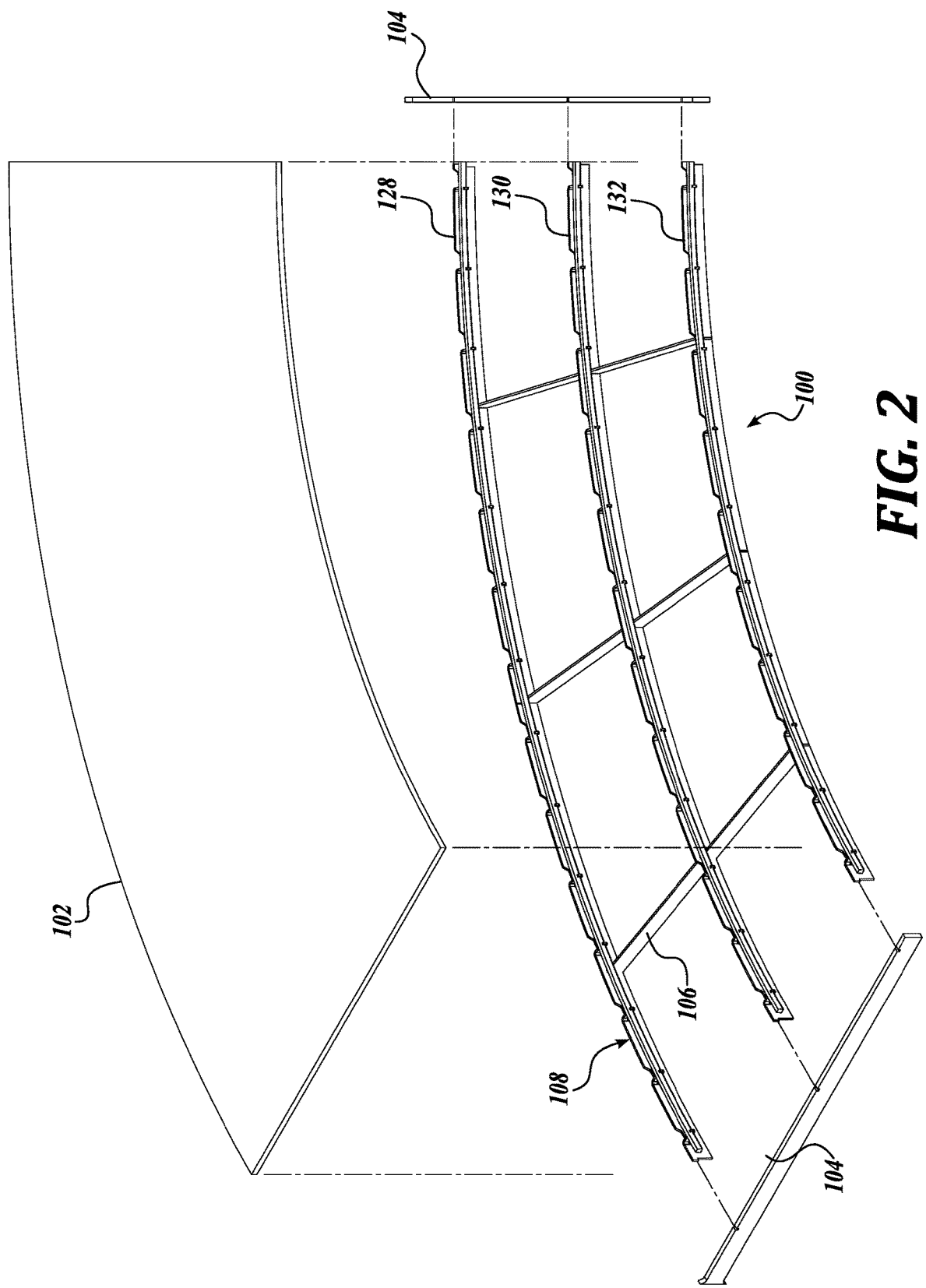
FIG. 2 is a diagrammatical illustration of the track system of FIG. 1 with the belt removed.

Returning to FIGS. 1-3, one embodiment of the rail and track system 108 is illustrated for one non-adjustable cartridge 100. It is to be appreciated that a similar rail and track system 108 is provided on the other non-adjustable cartridges 100 and the adjustable cartridges 114 with the modified rail ends. In one embodiment, the rail and track system 108 comprises an outer rail 128, a middle rail 130, and an inner rail 132. The number of rails can vary depending on the width of the belt 102 or the anticipated weight that needs to be supported. The rails 128, 130, 132 are initially slat shaped and are arranged in the rail and track system 108 so that the height is greater than the width. The rails 128, 130, 132 are curved in the direction of the spiral, and the rails 128, 130, 132 are parallel to each other with the understanding that the outer rail 128 will have a larger radius than the middle 130 and inner 132 rails. In a straight rail and track system, the rails 128, 130, 132 would be straight, but sill parallel. For additional support, the outer 128, middle 130, and inner 132 rails can be joined to a common transverse bar 106. In one embodiment, a non-adjustable cartridge 100 and an adjustable cartridge 114 can have three transverse bars 106. However, the number of transverse bars 106 can vary depending on the length of the rails 128, 130, 132 or the anticipated load on the rails 128, 130, 132.

Figure 3:
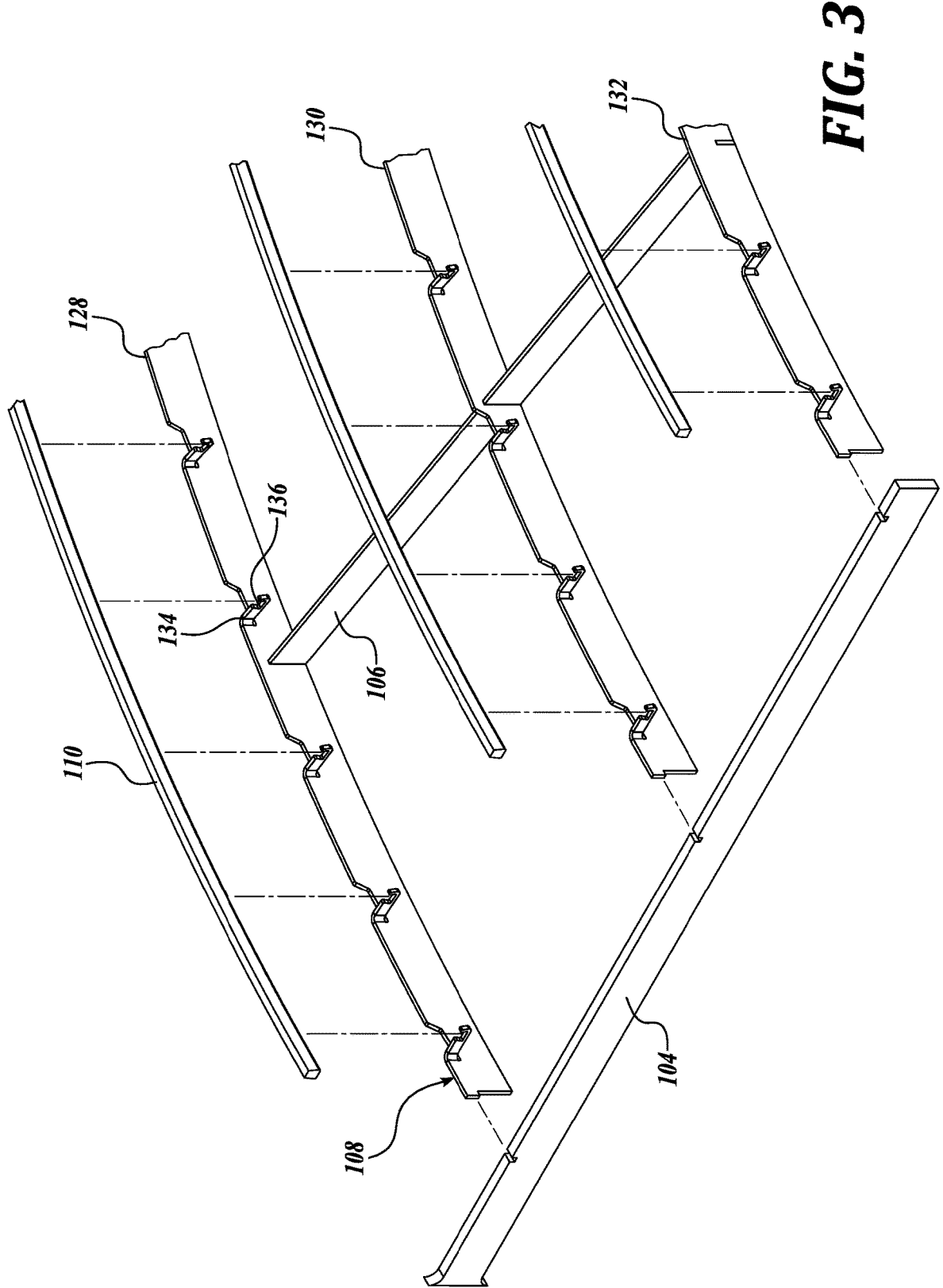
FIG. 3 is a close-up diagrammatical illustration of the track system of FIG. 1.

Referring to FIG. 3, and as mentioned above, the rails 128, 130, 132 are formed from thin metal slats, such as stainless steel or aluminum alloys or nickel alloys. The steel slats are then modified at the top side by providing a plurality of tabs 134 that project radially with respect to the respective rail 128, 130, or 132, which run along the spiral (or straight) path. The tabs 134 can project inward or outward from the respective rail 128, 130, or 132. In one embodiment, one method of forming the tabs 134 is to laser cut the shape of the tab 134 from the top side of the rails 128, 130, or 132, and then bend the tab 134. In one embodiment, the tabs 134 are further cut to provide a groove 136 on the top side of the tabs 134. The groove 136 profile is similar to the track 110 cross-sectional shape. However, in one embodiment, the groove 136 can be slightly smaller than the track 110 so as to create an interference fit that holds the track 110 in place. Other embodiments, may rely on different methods to hold the track 110 on the rails, such as fasteners.

In other embodiments, the tabs 134 can be welded to the sides of the rails 128, 130, 132. The track 110 is then placed in each of the tabs 134 on the grooves 136 for each rail 128, 130, 132. In one embodiment, the track 110 is made from a solid plastic extrusion. In one embodiment, the track 110 is retained in place by the interference fit within the grooves 136 of the tabs 134. The profile or cross-section of the track 110 can take on any number of shapes. In one embodiment, the profile of the track 110 can be "dovetail" with a wide base and narrower on the top. The corresponding grooves 136 can also be a dovetail shape. When the dovetail track 110 is inserted into the dovetail groove 136, it becomes hard for the track 110 to become loose. However, other profiles for the track 110 and groove 136 are possible that can also prevent dislodging the track 110 from the rails.

The tabs 134 offset the track 110 from the rails 128, 130, 132. For example, the tabs 134 place the track 110 to the side of the rails 128, 130, 132, and the tabs 134 place the top surface of the track 110 above the top surface of the rails 128, 130, 132. Therefore, the belt 102 slides on the track 110 upper surface not on the upper surface of the rails 128, 130, 132. The offset of the track 110 to the side and above the rails 128, 130, 132 created by the tabs 134 provide a belt-supporting rail and track system 108 that increases access for sanitation and inspection while greatly reducing overall contact surfaces. The disclosed rail and track system 108 can therefore satisfy strict requirements for cleanability and lowers risk of contamination in food and processing facilities.

The transverse bars 106 can be welded to the each of the rails 128, 130, 132 with lap joints. In a lap joint, a notch approximately half the height of the transverse bar 106 is cut from the upper side of the transverse bar 106, and a notch of the same depth is cut into the rails 128, 130, 132, but from the bottom side of the rails 128, 130, 132. The rails 128, 130, 132 together with the transverse bars 106 comprise a cartridge 100 weldment, that can be placed between two tier arms 104 in the belt-supporting spiral structure 112 of FIGS. 4 and 5. In FIG. 3, the tier arms 104 shown at both ends of the rails 128, 130, 132 should not be considered part of the cartridge 100. As described above, the tier arms 104 belong to framework of the belt-supporting spiral structure 112. Therefore, both ends of the cartridge 100 terminate in free ends of the rails 128, 130, 132. "Free ends" refers to the rails 128, 130, 132 of the cartridge 100 having some length from one or both ends not being joined to additional structure, but, the rails 128, 130, 132 can be joined by structure inbetween the free ends. However, when the cartridge 100 is joined to any two tier arms 104 via the rails 128, 130, 132, the free ends are joined to the tier arms 104. The tier arms 104 can be connected to the free ends of the rails 128, 130, 132 with welded lap joints, for example. Providing rail and track assemblies as cartridges 100 allows for easier construction of a straight or curved belt-supporting structures.

The description provided above with reference to FIGS. 4 and 5 details how individual non-adjustable cartridges 100 and adjustable cartridges 114 are added to create an entire rail and track system 108 to support the belt of the belt-conveying spiral structure 112.

Figure 6:
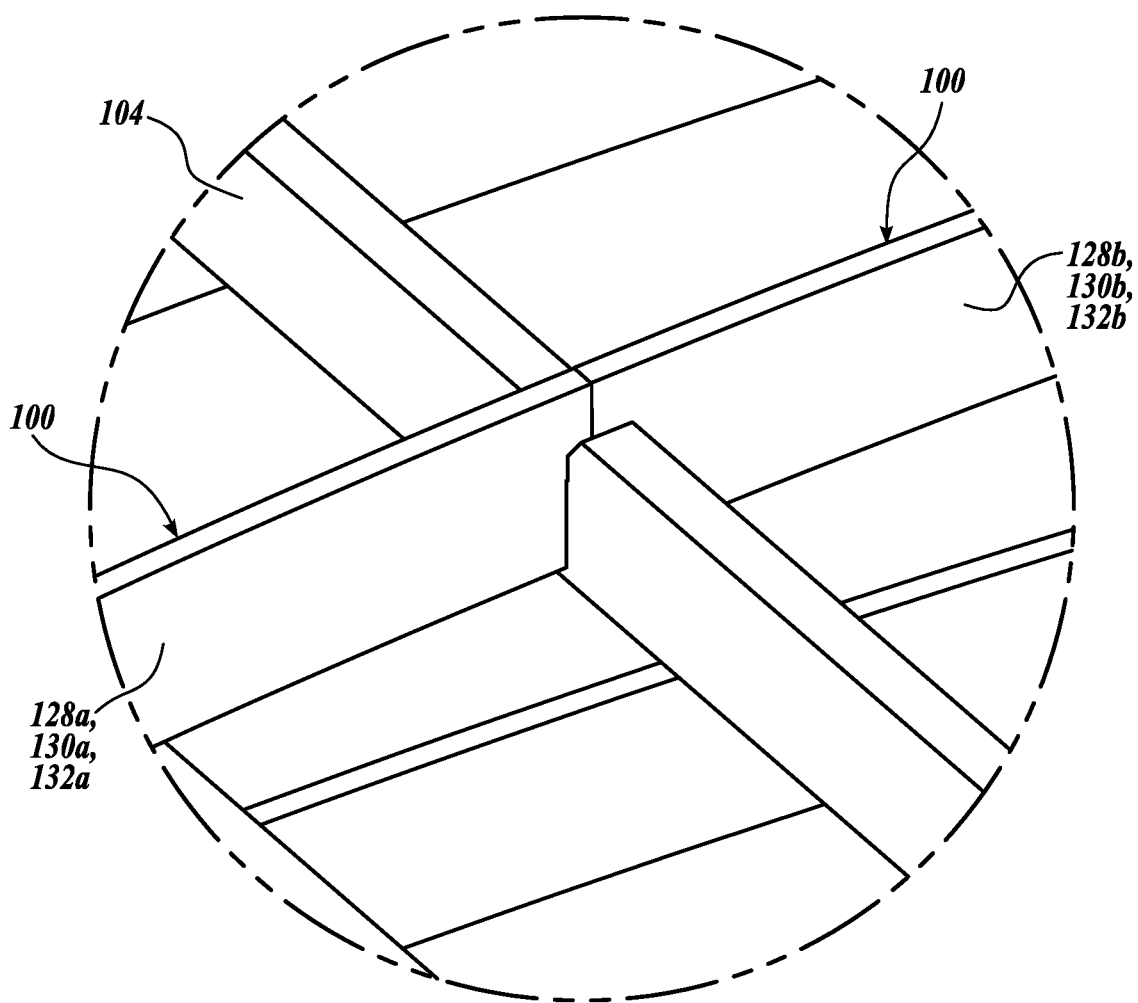
FIG. 6 is a close-up diagrammatical illustration of a non-adjustable cartridge joint to a tier arm in the belt-supporting spiral structure of FIG. 4.

Referring to FIG. 6, a detail close-up is shown of how a non-adjustable cartridge 100 is connected to a tier arm 104. FIG. 6 shows any rail 128a, 130a, 132a from a first cartridge 100 being joined to the tier arm 104, and any rail 128b, 130b, 132b being joined to the same tier arm 104 at the opposite side of the tier arm 104. It is understood that other rails are joined to the tier arm 104 in a similar manner. In one embodiment, the free ends of the rails 128a, 130a, 132a, and 128b, 130b, 132b are welded to the tier arm 104 with a lap joint. Further, the rail 128a, 130a, 132a juxtaposed to the rail 128b, 130b, 132b comprise rails from two adjacent non-adjustable cartridges 100 that can be butt-welded to each other and to the tier arm 104.

Figure 7:
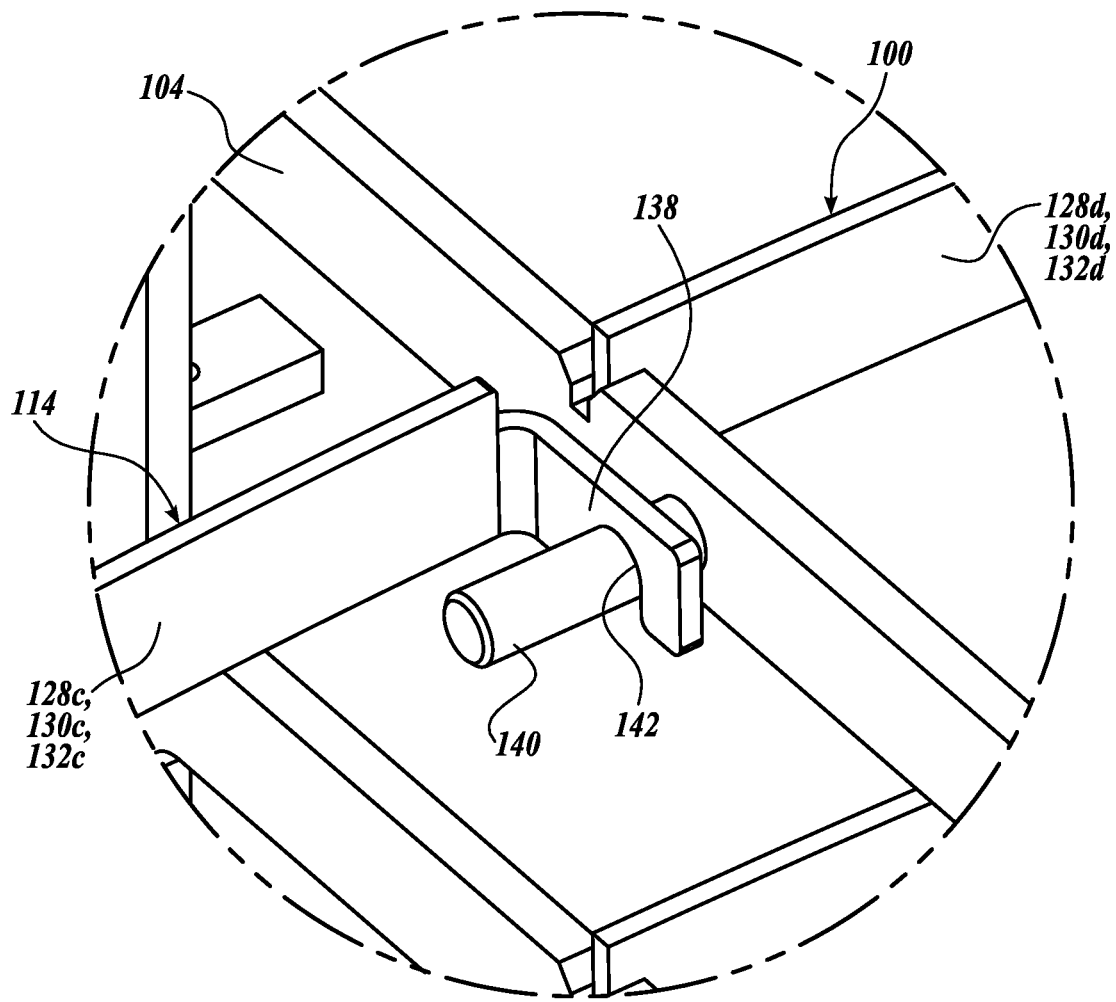
FIG. 7 is a close-up diagrammatical illustration of an adjustable cartridge joint to a tier arm in the belt-supporting spiral structure of FIG. 4

Referring to FIG. 7, a detail close-up is shown of how an adjustable cartridge 114 is connected to a tier arm 104. The adjustable cartridge 114 can be used when there is a misalignment of the free ends of the rails 128c, 130c, 132c with the rails 128d, 130d, 132d of an adjacent non-adjustable cartridge 100 or if the space between adjacent tier arms 104 is greater or less than the end-to-end length of a non-adjustable cartridge 100. In such cases, an adjustable cartridge 114 can be used instead of a non-adjustable cartridge 100. In one embodiment, the free ends of rails 128, 130, 132 of an adjustable cartridge 114 do not end in a lap cut. In one embodiment, the free ends of rails 128, 130, 132 terminate in a reduced height end piece 138 that can be bent at the right length so that adjustable cartridge 114 can fit within the space of the two adjacent improperly spaced tier arms 104. A corresponding joining component is provided on the tier arm 104. In one embodiment, the tier arm 104 is provided with a cylindrical peg 140 protruding from the side of the tier arm 104. In one embodiment, the peg 140 can be place perpendicular to the tier arm 104. To join the rail 128c, 130c, 132c that is not aligned with the lap cut in the tier arm 104, a slot 142 matching closely with the profile of the peg 140 is cut into the bottom side of the reduced height end piece 138 at the location which falls in line with the peg 140. Alternatively, the misaligned rail 128c, 130c, 132c, can be shifted to the right or left to correct the alignment, and bring rail 128c, 130c, 132d from the adjustable cartridge 114 in line with the rail 128d, 130d, 132d of the non-adjustable cartridge 100. Therefore, the manner of connecting rails of adjustable cartridges to tier arms 104 can correct for misalignment and/or inconsistent spacing between tier arms. To correct for any error in the spacing between adjacent tier arms 104 that cannot accommodate a standard non-adjustable cartridge 100, because the spacing is either too long or too short, the reduced height end piece 138, which need not be a reduced height, is bent at a location so that the adjustable cartridge 114 will fit in the irregular spacing. The reduced height end piece 138 is long enough so that a spacing less than the standard spacing can be accommodated by bending a longer section of the reduced height end piece 138. The reduced height end piece 138 is also long enough so that a spacing greater than the standard spacing can be accommodated by bending a short section of the reduced height end piece 138. Then, after bending, the reduced height end piece 138 can be cut at the location that matches with the peg 140. After placing the reduced height end piece 138 on the peg 140, the connection can be welded. An adjustable cartridge 114 can have the free ends of rails 128c, 130c, 132c comprise the reduced height end piece 138 on one or both ends of the rails 128c, 130c, 132c.

Accordingly, the adjustable cartridges 114 can address misalignments and also facilitate faster installation of a rail and track system 108.

In one embodiment, a rail and track cartridge 100, 114 for belt conveyors 102 comprises: two or more rails 128, 130, 132 connected to each other, wherein the two or more rails each has a first and second free end; and a track 110 connected to each rail, wherein each track is supported by tabs 134 protruding from the rail to which the track is connected, wherein the track is offset to the side from the rail to which the track is connected, and an upper track surface is above a top surface of the rail to which the track is connected.

In one embodiment, the tabs 134 are cut from the top side of the two or more rails.

In one embodiment, tabs 134 comprise a groove 136 within which the track is attached.

In one embodiment, the tracks 110 are made from plastic and the rails 128, 130, 132 are made from metal.

In one embodiment, the rail and track cartridge 100, 114 comprise transverse bars 106 connecting more than one rail into a rigid weldment.

In one embodiment, the rails 128, 130, 132 are curved or straight.

In one embodiment, the free ends of the rails 128c, 130c, 132c at a same side are bent to adjust the length of the rails.

In one embodiment, a method of making a belt-supporting structure 112, comprises: joining a plurality of the rail and track cartridges 100, 114 to form a belt-supporting spiral structure 112.

In one embodiment, the method further comprises attaching the first and second free ends of the rails 128, 130, 132 to a first and second tier arm 104, wherein each rail and track cartridge 100, 114 is supported between two tier arms.

In one embodiment, the free ends of the rails 128a, 130a, 132a 128b, 130b, 132b 128d, 130d, 132d of one or more rail and track cartridges 100 are not bent when joining to the tier arms 104.

In one embodiment, the free ends of the rails 128c, 130c, 132c of at least one end of one or more rail and track cartridges 114 are bent when joining to the tier arms 104 to adjust the length of the rails to fit between the tier arms.

In one embodiment, the tier arms 104 joined to the bent free ends comprise a peg 140 upon which the bent free ends rest, wherein the peg 140 extends perpendicular to the tier arm.

In one embodiment, a rail and track system 108 comprises: two or more rails 128, 130, 132 connected to each other, wherein the two or more rails each has a first and second end; a track 110 connected to each rail; and tier arms 104, wherein at least the first ends of the two or more rails 128c, 130c, 132c are bent and attached to a same tier arm 104 to adjust the length of the rails to fit within the tier arms.

In one embodiment, the tier arm 104 to which the bent first ends are attached comprises a peg 140 upon which the bent first ends rest.

In one embodiment, the tier arms 104 are supported from an outer vertical post 116 from which the tier arms extend inward.

In one embodiment, the rail and track system 108 further comprises a belt 102 supported by the tracks.

In one embodiment, each track 110 is supported by tabs 134 protruding from the rail 128, 130, 132 to which the track is connected, wherein the track is offset to the side from the rail to which the track is connected, and an upper track surface is above a top surface of the rail to which the track is connected.

In one embodiment, a rail and track system 108 for belt conveyors 102, comprises: two or more rails 128, 130, 132 connected to each other; and a track 110 connected to each rail, wherein each track is supported by tabs 134 protruding from the rail to which the track is connected, wherein the track is offset to the side from the rail to which the track is connected, and an upper track surface is above a top surface of the rail to which the track is connected.

In one embodiment, the tabs 134 are cut from the top side of the two or more rails.

In one embodiment, the tabs 134 comprise a groove 136 within which the track is attached.

While illustrative embodiments have been illustrated and described, it will be appreciated that various changes can be made therein without departing from the spirit and scope of the invention.

The embodiments of the invention in which an exclusive property or privilege is claimed are defined as follows:

1. A rail and track cartridge for belt conveyors, comprising:
    two or more rails connected to each other, wherein the two or more rails each has a first and second free end; and
    a track connected to each rail, wherein each track is supported by a plurality of tabs protruding from the rail to which the track is connected, wherein the track is offset to the side from the rail to which the track is connected, and an upper track surface is above a top surface of the rail to which the track is connected.

2. The rail and track cartridge of claim 1, wherein the tabs are cut from the top side of the two or more rails.

3. The rail and track cartridge of claim 1, wherein the tabs comprise a groove within which the track is attached.

4. The rail and track cartridge of claim 1, wherein the tracks are made from plastic and the rails are made from metal.

5. The rail and track cartridge of claim 1, comprising transverse bars connecting more than one rail into a rigid weldment.

6. The rail and track cartridge of claim 1, wherein the rails are curved or straight.

7. The rail and track cartridge of claim 1, wherein the free ends of the rails at a same side are bent to adjust the length of the rails.

8. A method of making a belt-supporting structure, comprising:
    joining a plurality of the rail and track cartridges of claim 1 to form a belt-supporting spiral structure.

9. The method of claim 8, further comprising attaching the first and second free ends of the rails to a first and second tier arm, wherein each rail and track cartridge is supported between two tier arms.

10. The method of claim 9, wherein the free ends of the rails of one or more rail and track cartridges are not bent when joining to the tier arms.

11. The method of claim 9, wherein the free ends of the rails of at least one end of one or more rail and track cartridges are bent when joining to the tier arms to adjust the length of the rails to fit between the tier arms.

12. The method of claim 11, wherein the tier arms joined to the bent free ends comprise a peg upon which the bent free ends rest.

13. A rail and track system, comprising:
    two or more rails connected to each other, wherein the two or more rails each has a first and second end;
    a track connected to each rail; and
    tier arms, wherein at least the first ends of the two or more rails are bent and attached to a same tier arm to adjust the length of the rails to fit within the tier arms.

14. The rail and track system of claim 13, wherein the tier arm to which the bent first ends are attached comprises a peg upon which the bent first ends rest.

15. The rail and track system of claim 13, wherein the tier arms are supported from an outer vertical post from which the tier arms extend inward.

16. The rail and track system of claim 13, further comprising a belt supported by the tracks.

17. The rail and track system of claim 13, wherein each track is supported by tabs protruding from the rail to which the track is connected, wherein the track is offset to the side from the rail to which the track is connected, and an upper track surface is above a top surface of the rail to which the track is connected.

18. A rail and track system for belt conveyors, comprising:
   two or more rails connected to each other; and
   a track connected to each rail, wherein each track is supported by a plurality of tabs protruding from the rail to which the track is connected, wherein the track is offset to the side from the rail to which the track is connected, and an upper track surface is above a top surface of the rail to which the track is connected.

19. The rail and track system of claim 18, wherein the tabs are cut from the top side of the two or more rails.

20. The rail and track cartridge of claim 19, wherein the tabs comprise a groove within which the track is attached.

\* \* \* \* \*